United States Patent [19]

Engelmann

[11] Patent Number: 5,085,076
[45] Date of Patent: Feb. 4, 1992

[54] INTEGRATED WATER STRAINER, METER, AND CROSSOVER CHECK VALVE

[75] Inventor: Lester B. Engelmann, Woodland, Calif.

[73] Assignee: Ames Company, Inc., Woodland, Calif.

[21] Appl. No.: 619,646

[22] Filed: Nov. 29, 1990

[51] Int. Cl.⁵ .......................... G01F 7/00; G01F 15/00
[52] U.S. Cl. ............................ 73/197; 73/198; 73/273; 73/861.92
[58] Field of Search ............ 73/197, 198, 861.89, 73/861.92, 861.93, 861.94, 273

[56] References Cited
U.S. PATENT DOCUMENTS

| | | | |
|---|---|---|---|
| 387,831 | 8/1888 | Thomson | 73/273 |
| 1,245,740 | 11/1917 | Krieg | 73/197 |
| 3,707,872 | 1/1973 | Masson et al. | 73/861.94 |

Primary Examiner—Herbert Goldstein
Attorney, Agent, or Firm—Lothrop & West

[57] ABSTRACT

A water strainer, water meter, and crossover check valve structurally and functionally integrated within a single housing having a single access port. A water strainer, including a screened portion and a solid floor, diverts debris from the water flow path into a collection chamber in the bottom portion of the housing. The water strainer defines an interior volume within the housing, designed to pass strained water and protect the impeller assembly of the water meter located therein. A strainer outlet pipe, extending from an outlet port into the interior volume of the housing, may be included to house both the impeller and the check valve. The single access port provides for service of the interior components and removal of collected debris.

15 Claims, 2 Drawing Sheets

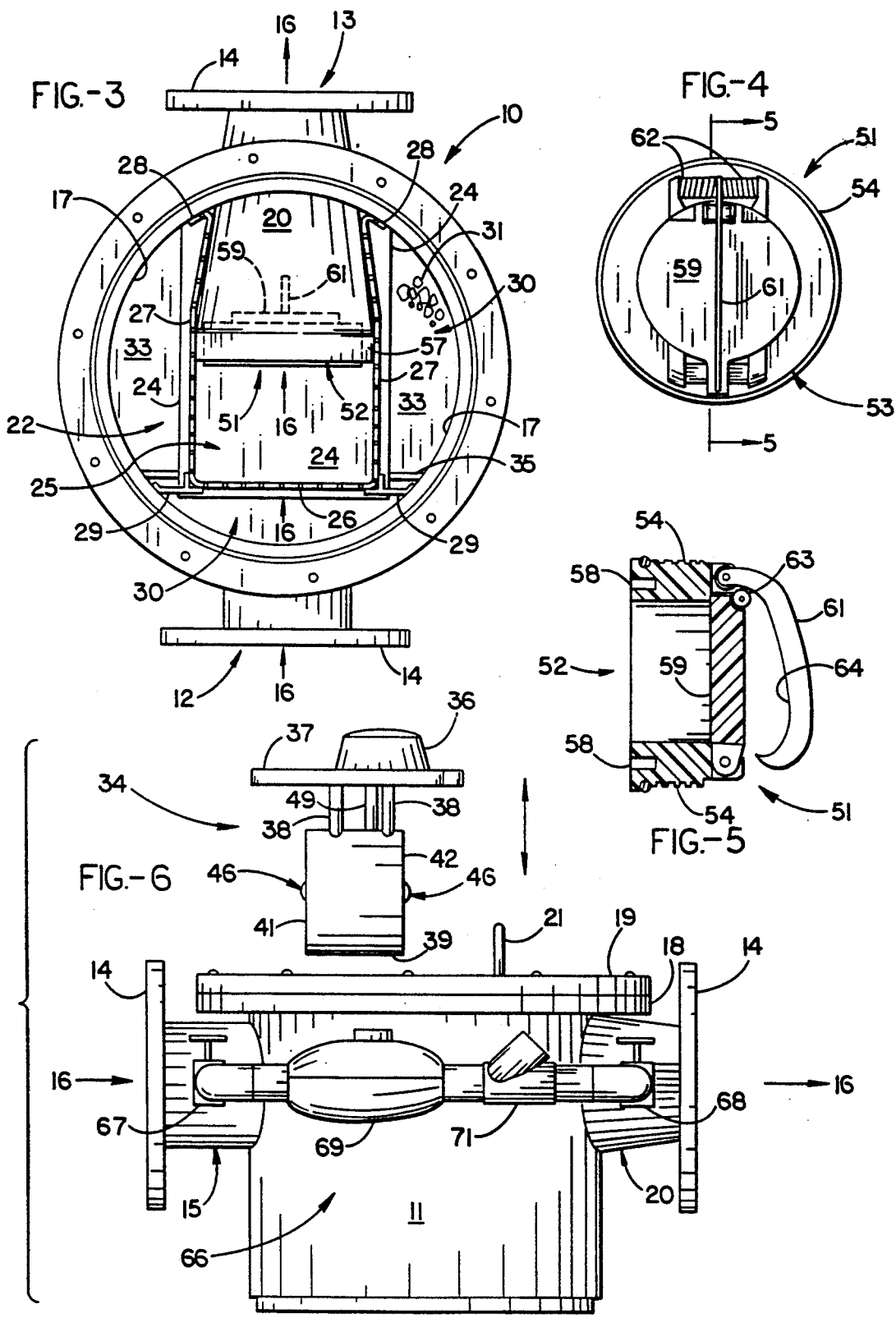

INTEGRATED WATER STRAINER, METER, AND CROSSOVER CHECK VALVE

FIELD OF THE INVENTION

The invention relates generally to the field of water flow metering devices, primarily for measuring the flow of large quantities of water provided to fire service lines, or the like. More specifically, a first version of the invention pertains to an industrial or commercial scale water strainer and a water flow meter, structurally and functionally integrated within a single, compact housing. A second version of the invention further includes the integration of a check valve within the same housing, having the water strainer and water flow meter of the first version.

BACKGROUND OF THE INVENTION

Almost all water supply systems require metering devices to measure accurately, the amount of water utilized by a private customer or by a public facility. Special metering devices and associated accessories are required where the rate of such water utilization on occasion is particularly high, and the attendant supply lines must therefore be of large diameter. For example, the 4" to 10" water supply mains required for fire service lines have the capability of providing maximum water flow rates varying from 1000 to 5500 gallons per minute. These same lines, however, may also be used to provide domestic water, at a much lower usage rate, on a daily basis.

By way of example, in a hotel or a hospital, a single large line would be called upon to supply water to faucets, toilets and showers for regular daily use, and would also be relied upon to supply water to an automatic sprinkler system during an emergency. A satisfactory metering device for such dual purpose water service lines must be capable of measuring not only the maximum flow rates which might be encountered, but also low and intermediate flow rates as well.

Two-stage metering systems have been designed to measure both low and high flow rates through these dual purpose water supply lines. Typically, a large turbine meter is provided in the main line, having a high degree of accuracy from 20 to 50 gallons per minute, or so, up to the maximum flow rate for the line. Lower flow rates, down to 1 gpm, are accurately measured through a bypass piping system having a smaller 1" or 2" meter, known in the trade as a bypass meter. The bypass system is connected in parallel with the turbine meter, having a diversion connection upstream from the turbine meter, and a re-entry connection downstream from a spring loaded check valve, or crossover valve.

When water is flowing at a rate below approximately 20 gpm, it is diverted into the bypass line by the closed crossover valve, and the bypass meter measures water usage. Once the water flow exceeds the predetermined rate, the crossover valve is forced open, and the main turbine meter becomes operative along with the bypass meter.

The large mains and high volumes of water associated with a dual purpose water service line, or a dedicated fire service line, will readily pass debris, such as sand, small rocks, and pipe corrosion directly into operative parts of the main turbine meter. Thus, an accessory strainer is typically provided upstream from the turbine meter to catch and collect the debris, preventing it from damaging or destroying the turbine impeller.

A strainer designed for high volume, or fire service line applications must have the capacity to retain a large amount of captured debris. This is usually accomplished by providing a screened basket or a screened tube in the strainer housing, to intercept and capture the debris within the screen element. These strainers are known in the trade as basket strainers, "Y"-type strainers, and "in-line" strainers.

To meet current industry standards, a strainer must also display a low pressure loss, less than 3 psi, even when fouled with debris. To attain this objective, a ratio of 4 to 1 between the open screen area of the strainer and the cross-sectional area of the main line, is desired.

Older fire service line metering assemblies were simply a collection of the discrete meter, strainer, and check valve components, bolted together through the use of mating flanges and couplers. This resulted in an assembly that was physically large and heavy, as well as expensive to install and maintain.

More recently, manufacturers have combined certain of these previously separate components into the same body or housing. For example, a turbine meter has been combined with a downstream crossover valve by means of a common housing for both components. Similarly, the prior art shows a strainer and turbine meter combination, physically removed from each other, but mounted within a common casting. However, other than using a common housing for individual components, the known prior art has not structurally and functionally integrated the three main components of a high volume water line metering assembly, in the manner disclosed herein.

SUMMARY OF THE INVENTION

In its most basic configuration, the present invention structurally and functionally integrates a water meter with a water strainer and its housing. This is accomplished by eliminating the separate meter housing, and mounting the components of the meter on and within a specially designed strainer and its associated housing.

The present strainer is designed to exclude rather than contain debris, so that intercepted debris is diverted from the main flow of water into a collection chamber, located in a lower part of the housing. The collection chamber is contained within an exterior volume in the housing, defined as the housing volume between the strainer and a water inlet port.

The strainer also defines an interior volume within the housing, designed to pass strained water and protect the impeller assembly of the meter therein. A strainer outlet pipe may also be provided, extending from an outlet port into the interior volume, for discharge of the strained water. Using this construction, a removable extension of the outlet pipe also becomes the impeller or turbine housing, providing an accurate measure of all water discharging therethrough.

The housing further includes a detachable strainer lid, which, when removed, provides entry through an access port into the interior and exterior volumes of the housing. The strainer lid also serves as a mounting surface for the meter register, and provides a support structure for the removable extension of the outlet pipe housing the meter's turbine. In this manner, the water flow meter is both structurally and functionally merged with the strainer.

In a second embodiment of the invention, the strainer and the turbine meter are further combined with a crossover check valve, also mounted within the strainer housing. Having this integral check valve, the second version of the invention may readily be fitted with an outboard bypass line, containing a bypass flow meter. In this way, a compact, two-stage water flow meter is provided for high volume water service lines.

This second version of the invention has a construction which integrates the check valve structurally and functionally with the strainer outlet pipe. The check valve is located directly within an infeed end of the outlet pipe, immediately downstream from the removable extension of the outlet pipe housing the meter turbine.

The check valve is designed to be selectively installed in and removed from the housing, by means of the single access port. To this end, exterior threads are provided on the check valve body, and interior threads are included within the infeed portion of the outlet pipe. Such a construction facilitates assembly, service, or modification of the components for different operating parameters. For example, the loading spring of the check valve could be replaced with a spring having different characteristics, to effect a higher or lower threshold flow rate for operation of the main turbine meter.

BRIEF DESCRIPTION OF THE DRAWINGS

FIG. 3 is a top plan view as in FIG. 1, with the bypass line deleted for clarity, and the strainer lid, removed to show the major internal components of the device;

FIG. 4 is an on-axis, end elevational view of the outlet side of the check valve;

FIG. 5 is a cross-sectional view of the check valve, taken along the line 5—5, in FIG. 4;

FIG. 6 is a side elevational view of the assembly shown in FIG. 1, but showing the turbine meter assembly temporarily removed from the strainer lid.

DETAILED DESCRIPTION OF THE PREFERRED EMBODIMENT

Figure 1:
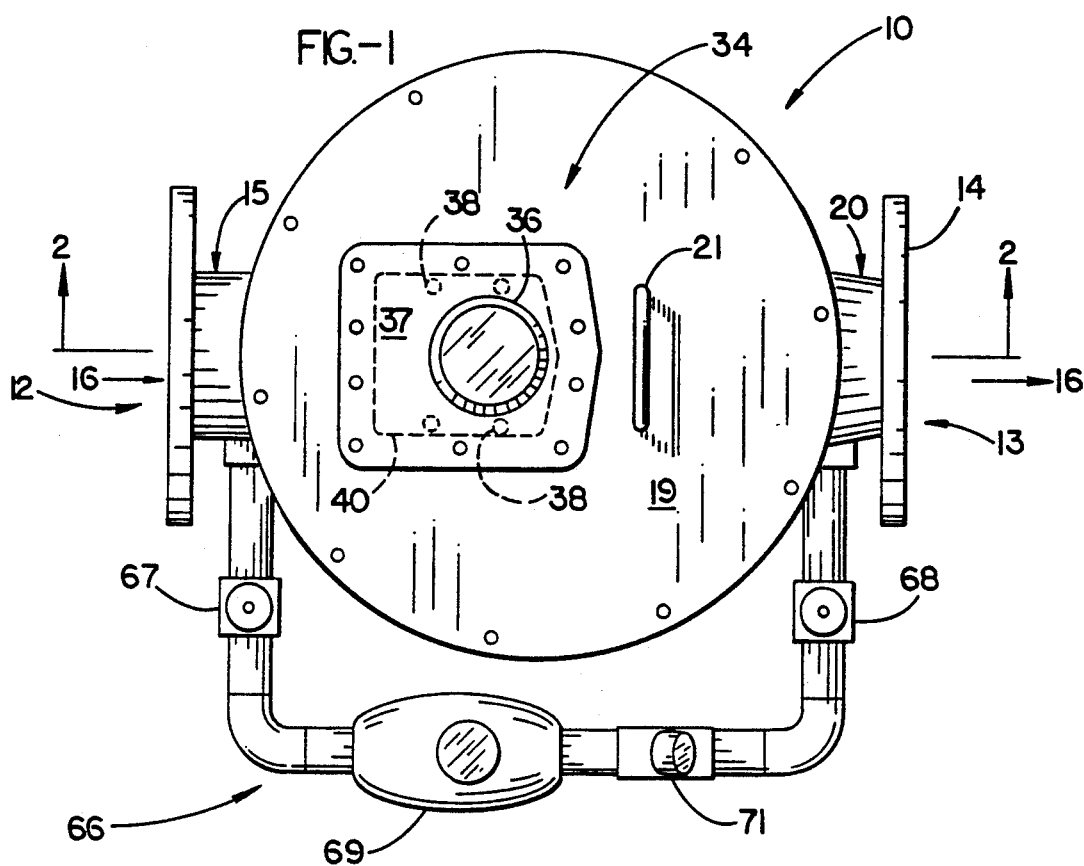
FIG. 1 is a top plan view of a dual stage water metering assembly, employing the integrated strainer, meter, and crossover valve construction of the present invention.

The invention includes a housing 10, having a right-circular cylindrical sidewall 11. Provided within the sidewall 11 are a water inlet port 12 and a water outlet port 13, defining, respectively, the beginning and the end of a water flow path 16 through the housing. Conventional flanges 14 are provided on a strainer inlet pipe 15 and a strainer outlet pipe 20, for convenient attachment to incoming and outgoing pipes.

An access port 17 is provided in an upper wall of housing 10, intermediate inlet port 12 and outlet port 13. A peripheral flange 18 is included around port 17, for the selective attachment and removal of strainer lid 19, or cover. A handle 21, welded to the upper surface of lid 19, facilitates removal and replacement of the lid.

A strainer 22 includes a screen, generally designated 23, and an isolation plate 24. Strainer 22 defines an interior volume 25 within the housing, surrounding at least a portion of strainer outlet pipe 20. Strainer 22 further defines an exterior volume 30 within the housing, between the strainer and the inlet port 12.

Screen 23 is U-shaped in plan, having an inlet portion 26, parallel side portions 27, and outlet end portions 28. Isolation plate 24 is slightly larger in plan than screen 23, providing a convenient base support for the upstanding screen. Angle pieces 29, welded to the inner sidewall of the housing, align and hold the inlet side corners of the screen securely in place. The resiliency and strength of the screen material is such that with the outlet end portions 28 pushed into snug fit with the adjacent inner sidewall of the housing, the screen 23 is rigidly maintained in the desired position.

Inlet portion 26 is transversely positioned with respect to water flow path 16, so as to intercept the majority of any incoming debris 31. The force of the incoming water may initially lodge the debris 31 against portion 26, but eventually, owing to turbulence, a decrease in water pressure, and gravity, debris will fall downwardly into a collection chamber 32.

Isolation plate 24 is vertically spaced from the circular floor plate 33 of the housing, defining therebetween the height of chamber 32. A support bar 35 is provided under the inlet end of plate 24, and filet welds are included under the outlet end of plate 24, to secure the plate. The location and configuration of isolation plate 24 is such that it maintains a relative quiescent zone within the collection chamber 32, so that whatever debris does enter the housing 10, will eventually come to rest and be stored within the chamber. Debris may be removed through access port 17 when lid 19 is removed, or it may be flushed out a drain port (not shown) in the lower portion of sidewall 11.

The screen material typically has a 50/50 ratio between perforate and imperforate areas. Therefore, to maintain the design goal of a 4 to 1 ratio between the total perforate area of the strainer and the cross-sectional area of the inlet pipe, an 8 to 1 ratio must be maintained when considering the total area of the screen 23. To meet this design objective, the parallel side portions 27 of the screen are included to provide additional effective working area for the strainer 22.

Figure 2:
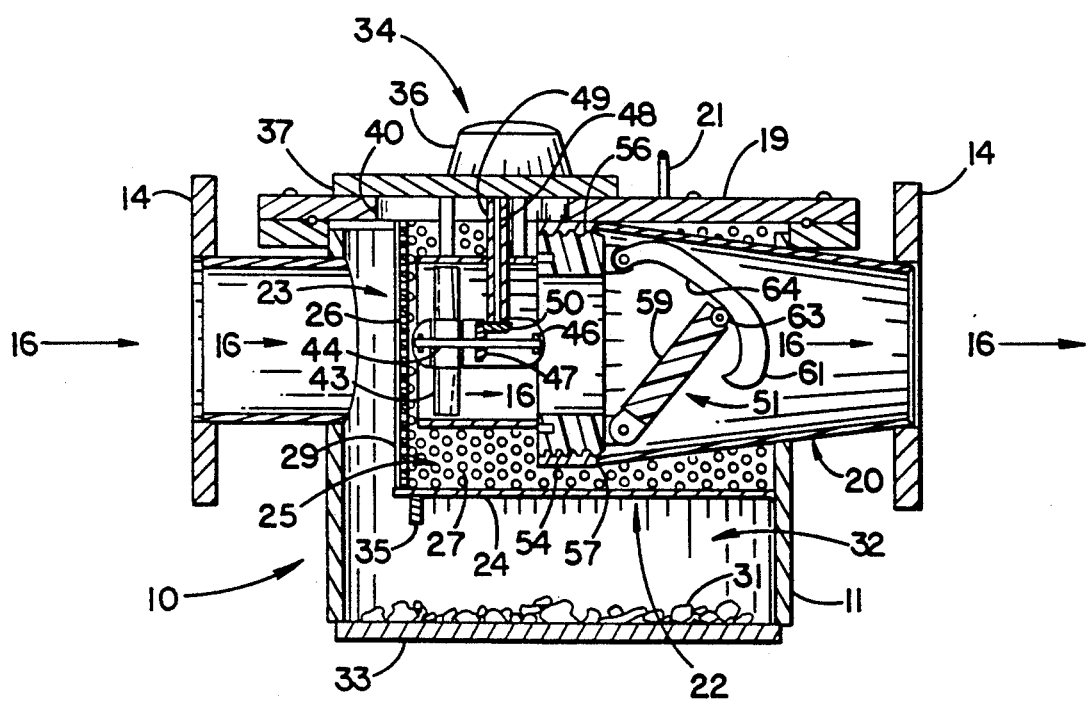
FIG. 2 is a longitudinal, cross-sectional view of the housing, taken along the line 2—2 shown in FIG. 1.

A meter assembly 34 includes a register 36, mounted on the upper surface of plate 37. Register 36 provides a cumulative visual readout of the gallons of water which have flowed through the housing 10. As shown in FIGS. 1, 2, and 6, plate 37 is bolted upon the upper surface of lid 19. Vertically depending from the underside of plate 37 and extending through an aperture 40 therein, are four support posts 38. A removable cylindrical extension 39 of the strainer outlet pipe 20 is supported by the lower ends of posts 38, so that the longitudinal axis of extension 39 is maintained substantially in parallel relation with water flow path 16.

Removable extension 39 has an infeed end 41 and an outflow end 42, as shown in FIG. 6. An impeller 43 is mounted at infeed end 41 on a shaft 44, for rotation about a first axis generally parallel to flow path 16. Shaft 44 is supported at each end by bearings 46, suspended by spider arms (not shown) within ends 41 and 42. Shaft 44 further includes a first bevel gear 47, intermediate bearings 46.

A second shaft 48, also mounted for axial rotation, extends through tube 49, along a second axis perpendicular to the first axis. The lower end of the shaft 48 includes a second bevel gear 50 meshed with first bevel gear 47. The upper end of shaft 48 is operatively connected to meter register 36, so that rotation of impeller 43 in response to the flow of water will produce accurate flow readings on the register.

A convenient way to make this operative connection is to mount a magnet (not shown) on the upper end of shaft 48, below the upper surface of plate 37. By manufacturing plate 37 from brass, the magnetic field of the magnet will largely be unaffected by the presence of the plate. Then, a rotatable, magnetically attractive element is provided within the lower portion of sealed register 36, mounted over the magnet. As an alternative, a direct shaft to register coupling may be used, but a shaft seal through the plate would then be required.

A check valve 51, having an inlet side 52 and an outlet side 53, is shown in detail in FIGS. 4 and 5. Any check valve capable of operating at the desired flow rate and adapted for installation within the strainer outlet pipe 20 is suitable for use in the present invention. Preferably, however, this check valve is made in accordance with the Differential Loading Fluid Check Valve made the subject of patent application Ser. No. 07/538,716, filed June 15, 1990, and assigned to the same assignee herein of record. The disclosure and subject matter of application Ser. No. 07/538,716 are hereby incorporated by reference into the present application.

External threads 54 are provided on the hard rubber or plastic body of check valve 51, and internal threads 56 are included within an infeed end 57 of strainer outlet pipe 20, for threadable attachment between the check valve and the pipe. As is shown most clearly in FIGS. 2 and 3, infeed end 57 and the installed check valve 51 extend interiorly within housing 10.

Inlet side 52 has plural recesses 58 extending into the valve body for engagement by plural respective pegs arranged and extending from a hand gripped tool (not shown), such as a spanner wrench. Use of this tool allows the check valve to be easily installed into and removed from the outlet pipe.

A circular clapper 59 is pivotally mounted on one edge of the outlet side 53 of the check valve. A cam arm 61, biased inwardly toward a closed position by a torsion spring 62, is pivotally mounted to the other edge of outlet side 53. A roller 63 is included on the movable end of the clapper 59, to engage the arcuate cam surface 64 of the cam arm. When a sufficient water pressure differential exists between the inlet side and the outlet side of the clapper, the clapper pivots outwardly toward an open position, as shown in FIG. 2, passing water through the valve and the outlet pipe 20.

The inlet side 52 of the check valve body presents a flat, ring-like surface for flush engagement by the outflow end 42 of the extension 39, housing the impeller 43. In other words, when the meter assembly 34 is lowered into the housing 10 and secured to lid 19, a snug fit is effected between outflow end 42 and inlet side 52 (see FIG. 2). When water is flowing through extension 39, the seal between these two mating surfaces is sufficiently effective that water flow readings remain accurate, despite the lack of O-rings, or other sealing devices between the contingent surfaces.

By-pass line 66, includes an upstream diversion connection, through the sidewall of strainer inlet pipe 15. A first gate valve 67 and a second gate valve 68 are provided for hydraulic isolation of the by-pass line, during repair or replacement of the components of the line 66. A by-pass water flow meter 69 is included to measure the lower rates of water flow passing through the line 66. Meter 69 would typically measure flow rates within a range of 1-20 gpm. A swing check valve 71, is included downstream from the meter 69, to prevent any backflow through the by-pass line. Line 66 lastly includes a downstream re-entry connection, through the sidewall of strainer outlet pipe 20.

In operation, check valve 51 assumes a normally closed position at low water flow rates. During this mode of operation, all of the incoming water is diverted through the by-pass line, and is registered in by-pass meter 69.

As the flow rate increases, the water pressure differential across the clapper 59 reaches a threshold level, and the bias of spring 62 is overcome. Upon further opening of the clapper, roller 63 travels along arcuate cam surface 64, providing a differential opening rate for further increases in water pressure. In other words, after partial opening of check valve 51, a proportionally smaller amount of pressure is required to effect complete opening.

When water is allowed to flow through the housing, including passage through the strainer 22, the extension 39, the check valve 51, and the outlet pipe 20, the register 36 accurately records water flow through path 16. Since water continues to flow through by-pass line 66 during both high and low water flow rates, the total amount of flow is determined by adding the recorded totals of register 36 and by-pass meter 69.

What is claimed is:

1. In combination, a fluid flow meter and strainer, comprising:
   a. a housing, having an inlet port and an outlet port defining a fluid flow path therebetween, said housing further including an access port in a wall of said housing intermediate said inlet and outlet ports;
   b. strainer means for retaining solid particles and allowing passage of said fluid flow path therethrough, said strainer means defining an interior volume surrounding said outlet port, and further defining an exterior volume between said strainer means and said inlet port, for the collection of solid particles;
   c. a strainer lid covering said access port, for allowing selective access into said interior volume; and,
   d. metering means located within said interior volume of said strainer means and positioned therein to intercept at least a portion of said fluid flow path, for measuring the rate of fluid flow through said housing.

2. In combination, a fluid flow meter and strainer, comprising:
   a. a housing, having an inlet port and an outlet port defining a fluid flow path therebetween, said housing further including an access port in a wall of said housing intermediate said inlet and outlet ports;
   b. a strainer outlet pipe located within said fluid flow path, having a discharge end connected to said outlet port, and an infeed end extending interiorly within said housing;
   c. strainer means for retaining solid particles and allowing passage of said fluid flow path therethrough, said strainer means surrounding at least said infeed end of said strainer outlet pipe to define an interior volume, and further defining an exterior volume between said strainer means and said inlet port, for the collection of solid particles;
   d. a strainer lid covering said access port, for allowing selective access into said interior volume; and,
   e. metering means within said strainer outlet pipe, for measuring the rate of fluid flow through said housing.

3. A device as in claim 2 in which said strainer means includes a screen, having at least a portion thereof transversely positioned within said fluid flow path.

4. A device as in claim 3 in which said housing has a floor, said strainer includes an isolation plate vertically spaced from said floor, and in which said screen further includes side portions upstanding from said isolation plate.

5. A device as in claim 2 in which said metering means includes: an impeller blade mounted for rotation about a first axis parallel to the flow of fluid through said outlet pipe; a first shaft extending from said impeller blade along said first axis to a first bevel gear; a flow meter mounted on said strainer lid; a second shaft extending from a second bevel gear, meshed with said first bevel gear, along a second axis perpendicular to said first axis, said second shaft being operatively interconnected to said flow meter.

6. In combination, a fluid flow meter, a strainer, and a check valve, comprising:
   a. a housing, having an inlet port and an outlet port defining a fluid flow path therebetween, said housing further including an access port in a wall of said housing intermediate said inlet and outlet ports;
   b. a check valve, having an inlet side and an outlet side;
   c. a strainer outlet pipe, having a downstream end connected to said outlet port and an infeed end extending interiorly within said housing;
   d. means for detachably securing said outlet side of said check valve to said infeed end of said strainer outlet pipe;
   e. a strainer outlet pipe extension, having an inflow end and an outflow end, said outflow end being maintained in snug relation over said inlet side of said check valve;
   f. strainer means for retaining solid particles and allowing passage of said fluid flow path therethrough, said strainer means defining an interior volume surrounding said inflow end of said strainer outlet pipe extension, and further defining an exterior volume between said strainer means and said inlet port, for the collection of solid particles;
   g. a strainer lid covering said access port, for allowing access into said interior volume and to said check valve; and,
   h. metering means within said strainer outlet pipe extension, for measuring the rate of fluid flow through said housing.

7. A device as in claim 6 in which said strainer means includes a screen, having at least a portion thereof transversely positioned within said fluid flow path.

8. A device as in claim 7 in which said housing has a floor, said strainer includes an isolation plate vertically spaced from said floor, and in which said screen further includes side portions upstanding from said isolation plate.

9. A device as in claim 6 in which said metering means includes: an impeller blade mounted for rotation about a first axis parallel to the flow of fluid through said strainer outlet pipe extension; a first shaft extending from said impeller blade along said first axis to a first bevel ear; a flow meter mounted on said strainer lid; a second shaft extending from a second bevel gear, meshed with said first bevel gear, along a second axis perpendicular to said first axis, said second axis being operatively interconnected to said flow meter.

10. A device as in claim 6 further including a by-pass line, said by-pass line comprising: an upstream diversion connection in communication with said exterior volume of said housing; a water flow meter in said by-pass line; a downstream re-entry connection, in communication with the interior of said strainer outlet pipe, downstream from said check valve.

11. A device as in claim 10, having a by-pass check valve in said by-pass line between said water flow meter and said downstream re-entry connection, to prevent backflow through said by-pass line.

12. A device as in claim 11 further including a first gate valve in said by-pass line between said upstream diversion connection and said water flow meter, and a second gate valve in said by-pass line, between said by-pass check valve and said downstream re-entry connection.

13. A device as in claim 6 in which said housing includes a right circular cylindrical sidewall and a circular plate floor.

14. A device as in claim 7 in which said screen includes perforate portions and imperforate portions, and in which the ratio between the total area of said perforate portions exceeds the cross-sectional diameter of said inlet port by a factor of four.

15. A device as in claim 9 including a magnet on the end of said second shaft remote from said second bevel gear, said magnet being located beneath said strainer lid and below said flow meter, and further including a rotatable, magnetically attractive element within a lower portion of said flow meter adjacent said magnet and responsive thereto.

* * * * *